United States Patent
Rybicki

(10) Patent No.: US 6,213,375 B1
(45) Date of Patent: Apr. 10, 2001

(54) MANUALLY OPERATED WELDING WIRE FEEDER

(75) Inventor: Daniel J. Rybicki, Houston, TX (US)

(73) Assignee: The United States of America as represented by the Administrator, National Aeronautics and Space Administration, Washington, DC (US)

(*) Notice: Subject to any disclaimer, the term of this patent is extended or adjusted under 35 U.S.C. 154(b) by 0 days.

(21) Appl. No.: 09/408,649

(22) Filed: Sep. 15, 1999

(51) Int. Cl.⁷ .................................................. B23K 9/133
(52) U.S. Cl. ........................................... 228/41; 219/137.2
(58) Field of Search .................... 228/41; 219/137.2, 219/136, 138, 75

(56) References Cited

U.S. PATENT DOCUMENTS

| | | |
|---|---|---|
| 1,377,792 | 5/1921 | Rice . |
| 1,851,420 | 3/1932 | Carson, Jr. . |
| 2,604,064 | 7/1952 | Sefton ................................ 113/109 |
| 3,356,273 | 12/1967 | Wallace ............................. 226/128 |
| 3,999,697 | 12/1976 | Hill, Jr. ............................. 226/128 |
| 4,068,106 | 1/1978 | Shaputis ........................... 219/137.2 |
| 4,206,862 | 6/1980 | DaCosta ............................ 226/178 |
| 4,665,300 | 5/1987 | Bellefleur ......................... 219/137.2 |
| 5,155,332 | 10/1992 | Maguire ............................ 219/137.2 |
| 5,326,958 | 7/1994 | Gues ................................ 219/137.31 |
| 5,521,355 | 5/1996 | Lorentzen ........................ 219/137.7 |
| 5,584,426 | 12/1996 | Ziesenis ............................ 228/41 |
| 5,782,394 | 7/1998 | Langley ............................ 226/187 |
| 5,839,643 * | 11/1998 | Tait ................................... 228/41 |
| 6,027,068 * | 2/2000 | Lantsman ......................... 228/41 |

* cited by examiner

Primary Examiner—Clifford C. Shaw
(74) Attorney, Agent, or Firm—Hardie R. Barr

(57) ABSTRACT

A manual welding wire feeder apparatus comprising a bendable elongate metal frame with a feed roller mounted at the center thereof for rotation about an axis transverse to the longitudinal axis of the frame. The frame ends are turned up as tabs and each provided with openings in alignment with each other and the mid-width center of the roller surface. The tab openings are sized to accommodate welding wire and each extends to a side edge of the tab, both opening on the same side of the frame, whereby welding wire can be side-loaded onto the frame.

On the side of the frame, opposite the roller a lock ring handle is attached tangentially and is rotatable about the attachment point and an axis perpendicular to the frame.

The device is grasped in the hand normally used to hold the wire. A finger is placed through the loop ring and the frame positioned across the palm and lower fingers. The thumb is positioned atop the wire so it can be moved from the back of the frame across the roller, and towards the front. In doing so, the wire is advanced at a steady rate in axial alignment with the tab openings and roller.

To accommodate different wire diameters the frame is bendable about its center in the plane of the frame axis and wire so as to keep the wire in sufficient tension against the roller and to keep the wire fixed when the frame is tilted and thumb pressure released.

12 Claims, 3 Drawing Sheets

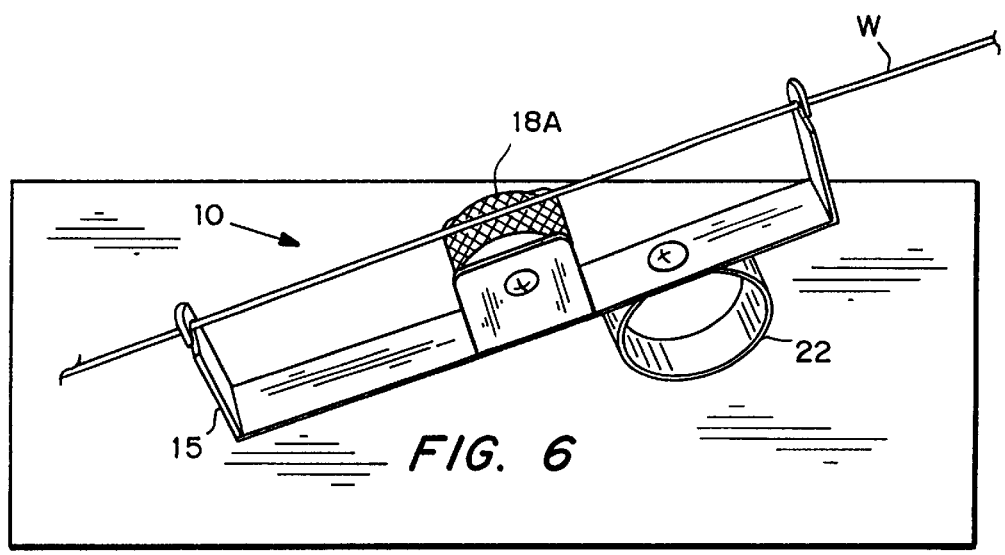
FIG. 6
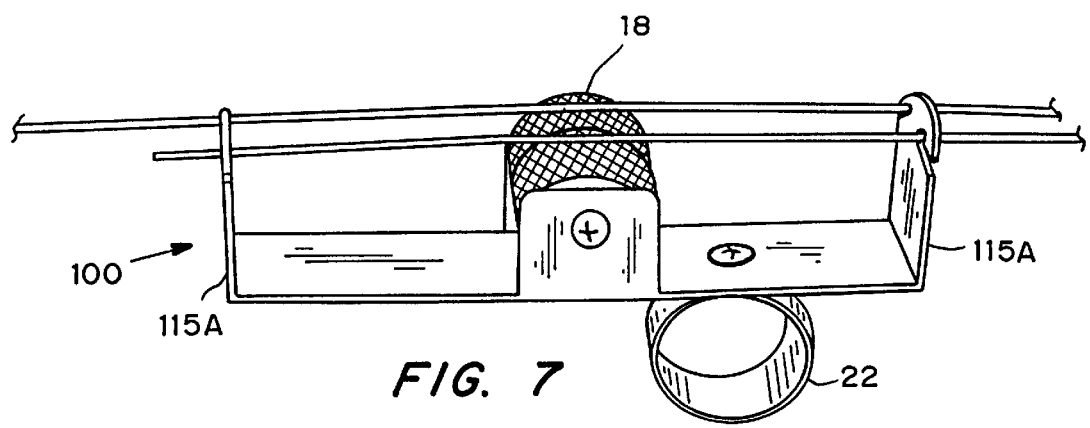
FIG. 7
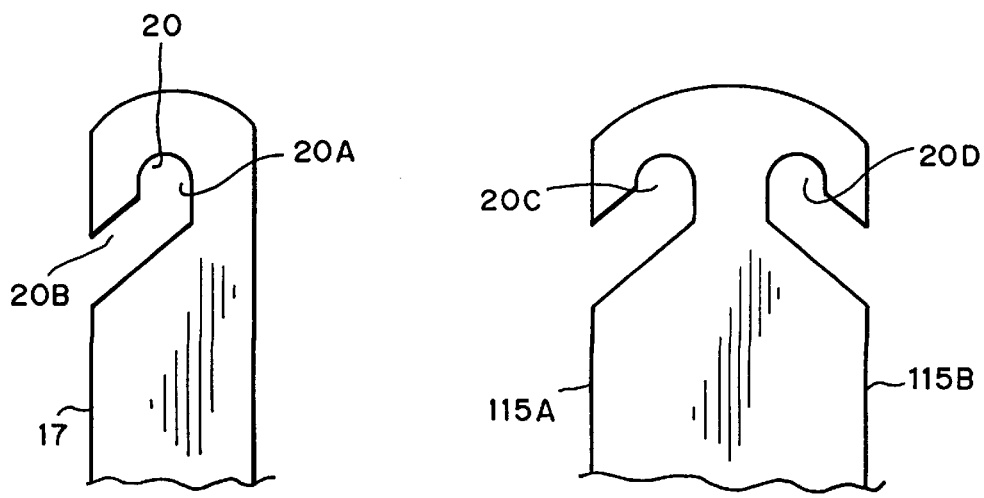
FIG. 8A
FIG. 8B

MANUALLY OPERATED WELDING WIRE FEEDER

ORIGIN OF THE INVENTION

The invention described herein was made in the performance of work under a NASA contract and is subject to the provisions of the National Aeronautics and Space Act of 1958, Public Law 85-568 (72 Stat. 435; 42.U.S.C. 2457).

FIELD OF THE INVENTION

The present invention relates to welding wire feeder apparatus and, more particularly, to a hand held and hand operated welding wire feed apparatus which simplifies and reduces the dexterous hand requirements for holding and manipulating the filler wire during a welding procedure.

BACKGROUND OF THE INVENTION

For manually applied Gas Tungsten Arc Welding (GTAW), which is the most widely selected welding process for aerospace related hardware, the filler metal is added into the molten weld pool in the form of wire which may be any of a variety of diameters from as small as 1/64" to as large as 3/16". Adding the wire is performed by the welder manually with one hand while the welding torch (arc heat source) is held and manipulated at the target weld location with the other hand. The action of manually manipulating the filler wire is a skill requiring significant physical dexterity in the hand, finger and wrist movements as well as precise mental dexterity regarding hand-to-eye coordination.

To ensure weld consistency, and thus weld integrity and resultant high quality hardware, the filler wire must be fed into the molten weld pool in a selective and specific manner to work in unison with the manual manipulations of the weld torch, which is applied and controlled by the opposite hand. Wide variations in specific hand, wrist, and finger movements are used from one welder to the next. No one specific hand technique/motion has been found which suits the skill level of every welder. Because of this, the repeatability and reliability of the GTAW process, when manually applied, is highly dependent upon the human factor; that is, the skill of the welder in manipulating the welding torch while concurrently feeding the filler wire into the weld pool.

Various welding wire feed systems are available in the prior art. For example, U.S. Pat. No. 5,155,832 discloses a welding wire feeder designed to fit in a user's hand. A thumb operated feed wheel rolls against an idler roller and frictionally advances the welding wire through the rollers and a pair of guide tubes.

U.S. Pat. No. 4,206,862 discloses a device including an electric motor for advancing welding wire through a handpiece. A potentiometer responsive to a finger pressure-sensitive switch on the handpiece regulates the motor speed and rate of wire advancement.

U.S. Pat. No. 1,377,792 discloses a tube to hold welding wire with a finger-operated friction lock to fix the wire in the tube until more wire is desired at which time the wire is simply grasped and slid further into the tube.

U.S. Pat. No. 3,989,697 discloses a wire feeder device for mounting on the welder's hand between the thumb and index finder. The wire is passed through fixed and moveable tubular feeders on the device which are designed to advance the wire as the moveable feeder moves back and forth when the index finger and thumb are squeezed together and released.

U.S. Pat. No. 5,782,394 disclosed a manual hand-held wire feeder having a tubular holder through which the welding wire is passed. The feeder includes a finger wheel on the holder and an idler wheel biased to the finger wheel by an elastic band. The wire is advanced by the finger wheel which is rotated by the index finger.

U.S. Pat. No. 5,584,426 discloses a welding wire holding device comprising a housing with a handle. The wire is passed through the housing and advanced by a thumb wheel mounted within the housing but protruding from the side thereof so as to allow its manipulation by the welder's thumb whereby the wire is advanced between a driving roller and compression roller.

All of the foregoing have disadvantages in one aspect or another in that they are structurally complex, unduly large, heavy and expensive, may require considerable efforts and dexterity of the welder in using the feeder device and in loading welding wire thereon, and with an associated and undesirable expenditure of time.

SUMMARY OF THE INVENTION OF THE INVENTION

The invention is a manually operated welding wire feeder apparatus comprising an elongate metal frame with a feed roller mounted at the center of the frame for rotation about an axis transverse to the longitudinal axis of the frame. The frame ends are turned up as tabs approximately 90° to the frame axis and each provided with openings in alignment with each other and the mid-width center of the roller surface. The tab openings accommodate a range of welding wire sizes and include slot extensions leading to a side edge of the tab, both opening at edges on the same side of the frame, thereby allowing for welding wire to be side-loaded onto the frame.

On the side of the frame, opposite the roller, a loop ring handle is attached tangentially to the frame by a rivet or other means allowing the ring to rotate about the attachment point and about an axis perpendicular to the longitudinal axis of the frame.

The device is used by grasping it in the hand normally used to hold the wire. The index or middle finger is placed through the loop ring and the frame moved so as to position the device across the palm and lower portion of the fingers. The thumb is brought over the top of the wire and positioned thereon so it can be moved from near the back of the frame, across the roller, and towards the front of the frame. In doing so, the wire will be advanced at a steady rate to a predictable location and in an axial alignment with the tab openings and the roller.

To accommodate different wire diameters the frame is bent slightly about its center in the plane of the frame axis and wire so as to keep the wire in tension against the roller by a pressure sufficient to keep the wire fixed in the frame when tilted and thumb pressure is momentarily released.

BRIEF DESCRIPTION OF THE DRAWINGS

FIG. 6 is a perspective view showing the apparatus of the invention as it rests on a work surface and elevates the filler wire from the work surface;

FIG. 7 is a perspective view of an alternate embodiment of the wire feeder apparatus of the invention which is adapted to hold multiple lengths of weld filler wire for accommodating long welds or situations where multiple well starts and stops are undesirable;

FIG. 8(a) is an end view of the frame member of FIG. 1(a); and

FIG. 8(b) is an end view of the frame member in the alternate embodiment of the invention shown in FIG. 7.

DETAILED DESCRIPTION OF THE INVENTION

Figure 1:
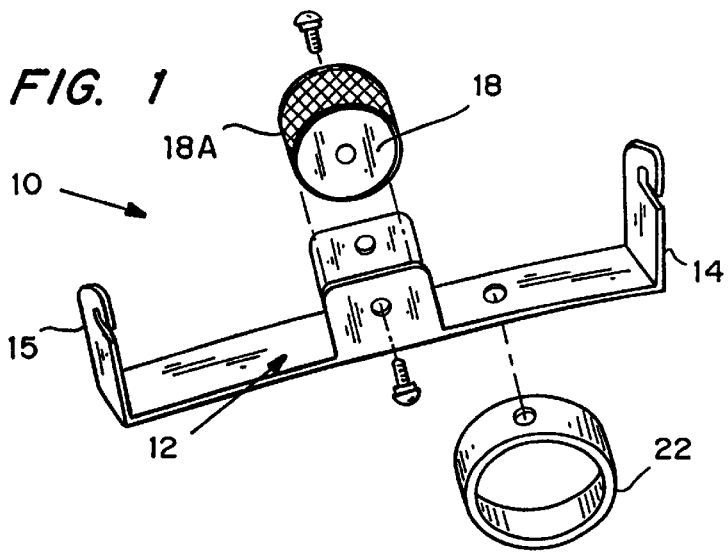
FIG. 1(a) is a perspective view of the frame member of the welding wire feed apparatus of the invention.
Figure 2:
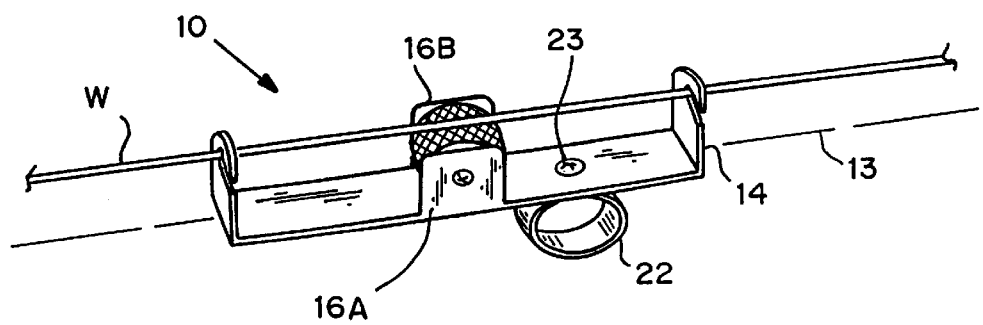
FIG. 2 is a perspective view of a preferred embodiment of the welding wire feed apparatus of the present invention.

Referring more particularly to the drawings, there is shown in FIG. 2 a welding wire feeder apparatus 10 of the present invention, which has been designed to reduce and overcome manual dexterity problems typically associated with conventional welding wire feeder devices. The apparatus 10 comprises an elongate metal frame 12, the ends of which are turned up to provide tabs 14,15 projecting at 90 degrees to the long axis 13 of the frame. At its mid-length, the frame 10 is provided with a second pair of upwardly projecting tabs 16A, 16B which extend along the opposite sides of the frame 12 in parallel relation to the longitudinal axis of the frame. A feed roller 18 is mounted on the tabs 16A, 16B for rotation about an axis transverse to the frame axis. The roller 18 is mounted on a polyamide bushing of VESPEL™ or TORION™ material to facilitate low friction movement of the roller.

The distal upper ends 14a,15a of the end tabs 14,15 are aligned to protrude slightly above the knurled roller surface 18A of the roller 18. As best seen in FIG. 8(a), the tabs 14,15 are each provided with a hole or slot-like opening 20, the upper end 20A of which is at a central location near the upper end of the tab. Each opening 20 includes a slot-like extension 20B which extends downwardly from its upper end at approximately a 45 degree angle to open at a side edge 17. The width of each opening 20 is such as to accommodate welding wire therethrough, which may be any of a variety of diameters from as small as 1/64 inch to as large as 3/16 inch. The centers of the upper end portions 20A of the openings 20 are aligned with each other and the mid-width center of the roller surface 18A and in a line which extends just above the inner diameter of the roller 18.

On the side of the frame 10, opposite the roller 18, a loop ring 22 is attached tangentially to the frame by a rivet 23 or other suitable means which allows the ring 22 to rotate about its attachment point and about an axis perpendicular to the longitudinal axis of the frame. The loop ring 22 serves as a handle to assist the welder in holding the apparatus 10.

Figure 4:
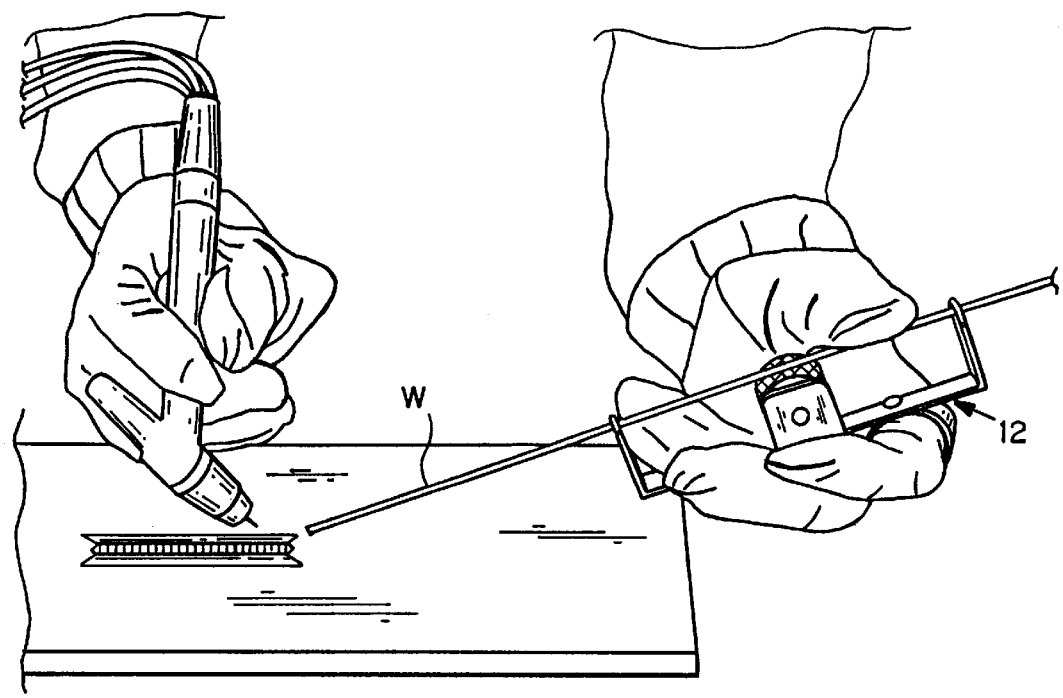
FIG. 4 is a perspective view showing a welder holding the apparatus of the invention in a position suitable for a welding operation.
Figure 5:
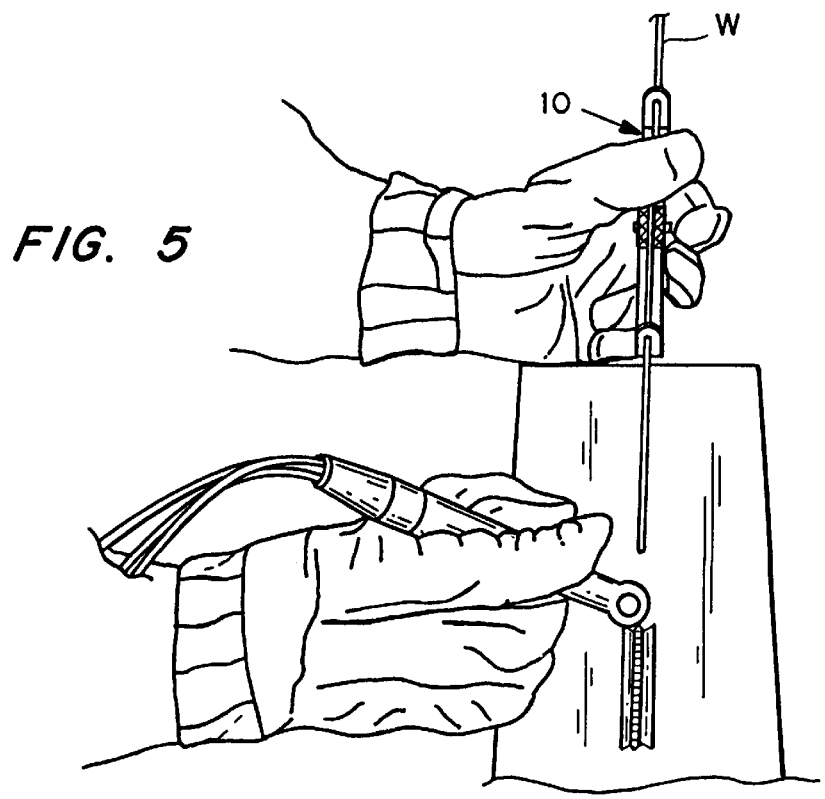
FIG. 5 is a view showing the hand positions of the welder as he hold the wire feeder apparatus of the invention during a welding operation.

The device 10 is used by grasping it in the hand normally used to hold the wire. The index or middle finger is placed through the loop ring 22 and the frame moved so as to position the device across the palm and lower portion of the fingers as shown in FIGS. 4 and 5. The thumb is brought over the top of the wire and positioned thereon so it can be moved from near the back of the frame, across the roller 18, and towards the front of the frame. In doing so, the wire will be advanced at a steady rate to a predictable location and in an axial alignment with the tab openings 20 and the roller 18.

When another length of welding wire and re-loading becomes necessary, the wire can be quickly side-loaded onto the end tabs of the frame in a very short time as compared to reloading requirements associated with other known feeder apparatus.

Figure 3:
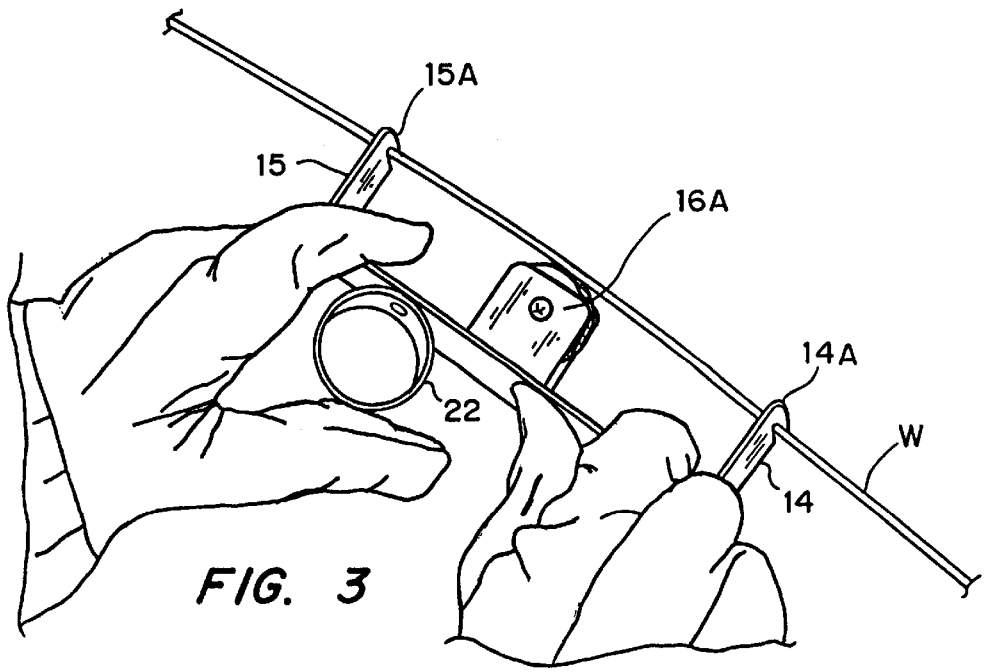
FIG. 3 is a perspective view which shows a welder gripping the frame of the apparatus of FIG. 1 and bending it slightly to place a tension on the filler wire so that it will remain fixed on the frame roller when the frame is tilted and thumb pressure on the wire is momentarily released.

It is also to be noted that a small amount of wire tension is required to keep the wire in contact with the roller 18 so that it will remain fixed in the tabs 14,15 of the frame, should the frame be tilted from the vertical plane and the welder's thumb momentarily releases the welding wire. However, it is also to be appreciated that too much wire tension may cause undue friction and not allow the wire to be pushed easily across the roller 18. Therefore to accommodate different wire diameters and adjust the wire tension, the frame 12 is grasped by the welder as shown in FIG. 3 and bent very slightly about its center in the plane defined by the frame axis and the welding wire. The two holes of the frame are both bent in the same direction, either upwardly or downwardly, so that the wire W applies the right amount of pressure against the roller 18. By extensive trial and error practice, it has been determined that the correct amount of tension on the wire can be readily assessed by holding the apparatus 10 with the wire extending vertically without the welder touching the wire. If the wire just barely holds in place against its own weight, the tension is correct.

It will therefore be seen that a new and improved manually operating welding wire feeder apparatus is disclosed herein which can be held in either hand, with or without gloves, and significantly reduces the dexterous hand motion requirements associated with similar devices. When in use, the welding can open his hand freely without fear of dropping the device as the finger loop ring proves positive attachment control. Also, the provision of eyelet-like openings in the end tabs of the frame allows for loading a fresh length of welding wire onto the frame from the side thereof and is therefore extremely fast, particularly when compared to devices which require the wire to be threaded into the feeder apparatus. The device can be used very close to the workpiece and allows utilization of filler metal to within 3 inches of the end such that there is very little waste. The device is lightweight, compact, fits easily and comfortably in the hand and can be carried in one's pocket. For use, the device requires no special motor skills of the welder and utilizes the natural motion that a welder uses in feeding filler wire without the aid of a feeder device. The device, due to its open frame, also allows for a much longer feed stroke than conventional devices. With the wire exposed, the thumb motion can be taken from the eyelet opening on the back tab to the front tab opening in one continuous motion thereby providing approximately four inches of wire feed in one stroke whereas it is to be appreciated that the more individual finger strokes required by conventional hand feeder devices means there is more movement of the tip of the wire at the molten puddle at the workpiece and thence more inaccuracy in placing the wire.

It is also to be appreciated that use of the device allows the welder to rest his hand on the workpiece and if the welder should place the device on the work surface as shown in FIG. 6 and remove his hand from the device, the wire is kept elevated off the work surface and therefore will be kept clear.

To accommodate long welds or situations where multiple weld starts and stops are not desirable, an alternate embodiment of the invention as shown in FIG. 7 has been developed which provides for holding two separate lengths of filler wire. As shown in FIG. 8(b) the alternate embodiment 100 of the invention is provided with two openings 20C, 20D, each of which opens at a different side edge 115A, 115B, of the tab 115. The openings 20C and 20D are identical to the openings 20 as previously described and similarly located except corresponding pairs of openings 20C and pair 20D are aligned on opposite sides of the mid-width center of the roller surface 18A.

It is further to be appreciated the additional embodiments of the invention can be made which can hold three or four welding wires simultaneously. However, such a design of the device would be limited to the size of the welders hand as well as to its practicality.

It is to be appreciated therefore that the foregoing description of the invention ha been presented for purposes of explanation and illustration and it not intended to limit the invention to the precise form disclosed. For example, the frame could be provided with other means than the center tabs for supporting the feed roller 18. The eyelet-like openings 20 in the tabs could also be circular openings as would require threading the welding wire therethrough instead of side-loading. It is to be appreciated therefore that various changes in materials and structure may be made by those skilled in the art without departing from the spirit of the invention.

What is claimed is:

1. A manually operated welding wire feeder apparatus comprising:

an elongate linear frame having a central longitudinal axis and with tabs provided at the opposite ends thereof and which project from the same side of said frame;

a roller mounted on said frame at the mid point of its length and adapted for rotation about an axis perpendicular to the longitudinal axis of the frame, each said end tab having an opening located therein such that the openings in each said tab are in alignment with each other in a line centered near the mid-width of the roller surface and in parallel relation to the longitudinal axis of said frame; each said opening being of a size to accommodate a welding wire therethrough such that a welding wire passing through said openings engages the outer circumference surface of said roller and is advanceable through said openings in the direction of rotation of said roller as may be urged by the thumb of the welder placed atop the wire and moved from the read of the frame and across the roller towards the front of the frame.

2. A manually operating welding wire feeder apparatus as set forth in claim 1, said apparatus further comprising:

a handle means attached to said frame to assist a welder in holding the device, said handle means being attached thereto on a side thereof which is opposite the side of the frame from which the end tabs project, and means for attaching said handle whereby said handle is rotatable about an axis substantially perpendicular to the longitudinal axis of the frame.

3. A manually operated welding wire feeder as set forth in claim 2 wherein said handle means is in the form of a loop ring attached tangentially to the frame and rotatable about its point of attachment.

4. A manually operating welding wire feeder apparatus as set forth in claim 1 wherein said frame is of bendable material such that when a welding wire is passed through said tab openings the frame can be bent about its mid-length point to apply a tension to the wire which is appropriate to maintain the welding wire in contact with the outer circumference surface of the roller whereby the wire will remain fixed if the frame is tilted and the wire released by the welder's thumb.

5. A manually operated wire feeder apparatus as set forth in claim 1, wherein each said opening in said tabs extends to a side edge of the tab in a direction away from the distal end of the tab, and said openings open in tab side edges on the same side of the frame whereby a welding wire can be side loaded onto the frame.

6. A manually operating welding wire feeder apparatus as set forth in claim 1 wherein each said tab is provided with a second opening therein which extends to a different side edge of the tab than the other opening in the tab and in a direction away from the distal end edge of the tab, said second openings in the tabs being in alignment with each other in a line in parallel relation to the longitudinal axis of said frame and said other tab openings, each said second tab opening being of a size to accommodate a welding wire therethrough such that a welding wire passing through both said second openings engages the outer circumference surface of said roller and is advanceable through said second openings in the direction of rotation of said roller as urged by the thumb of the welder.

7. A manually operated welding wire feed apparatus, said apparatus including a handpiece comprising a elongate line frame having a central longitudinal axis and provided with a first pair of tabs at the opposite ends thereof, which tabs project in perpendicular relation to the central longitudinal axis of the frame and in the same direction from said frame;

a second pair of tabs provided on opposite sides of the elongate section of the frame and extending therefrom in substantially parallel relation to one another and in the same direction as said end tabs with respect to said frame;

a roller supported on the second pair of tabs substantially at the mid-length section of the frame and mount ed therebetween f or rotation about an axis perpendicular with respect to the longitudinal axis of the frame, each of said pair of end tabs having an opening therethrough and formed in alignment with each other and the outer circumference surface of the roller, a loop ring attached to said frame in tangential relation thereto and on the side of the frame opposite said roller, and means for mounting said loop ring for rotation about its attachment point to the frame and about an axis perpendicular to the central longitudinal axis of the frame.

8. A manually operated welding wire feed apparatus as set forth in claim 7 wherein each said opening in said tabs extends to a side edge of the tab in a direction away from the top edge of the tab and said openings open in side edges of the tabs which are in the same side of the frame whereby welding wire maya be side loaded onto the frame.

9. A manually operated welding wire feed apparatus as set forth in claim 8 wherein said from is of bendable material such that when a welding wire is passed through said tab openings the frame can be bent about its mid-length point to apply a tension to the wire which is appropriate to maintain the welding wire in contact with the outer circumference surface of the roller whereby the wire will remain fixed in the frame when tilted.

10. A manually operated wire feeder apparatus as set forth in claim 9 wherein said outer circumference roller surface is a knurled surface.

11. A manually operated wire feeder apparatus as set forth in claim 7, wherein said roller has an outer circumference surface of substantially circular cylinder configuration and wherein said tab openings are aligned such that a linear welding wire passing through said openings engages said circular cylinder surface at the mid width part of said roller cylinder surface.

12. A manually operated welding wire feeder apparatus as set forth in claim 7 wherein said frame is of bendable material such that when a welding wire is passed through said tab openings the frame can be bent about its mid-length point to apply a tension to the wire which is appropriate to maintain the welding wire in contact with the outer circumference surface of the roller whereby the wire will remain fixed in the frame when the frame is tilted.

* * * * *